United States Patent [19]
Smith et al.

[11] 3,979,225
[45] Sept. 7, 1976

[54] NITROGEN DIOXIDE REGENERATIVE FUEL CELL

[75] Inventors: Stanley W. Smith, Vernon, Conn.; Lawrence J. Bregoli, Southwick, Mass.

[73] Assignee: United Technologies Corporation, East Hartford, Conn.

[22] Filed: Dec. 13, 1974

[21] Appl. No.: 532,568

[52] U.S. Cl. .................................. 429/17; 136/86 E
[51] Int. Cl.² ........................................ H01M 8/06
[58] Field of Search ............... 136/86 C, 86 R, 86 E

[56] References Cited
UNITED STATES PATENTS

| | | |
|---|---|---|
| 3,261,717 | 7/1966 | Shropshire et al. ............... 136/86 R |
| 3,281,274 | 10/1966 | Moerehofer ...................... 136/86 R |
| 3,442,715 | 5/1969 | Yu et al. ........................... 136/122 |

*Primary Examiner*—T. Tung
*Assistant Examiner*—H. A. Feeley
*Attorney, Agent, or Firm*—Steven F. Stone

[57] ABSTRACT

A fuel cell is disclosed in which the cathode is a gaseous diffusion fuel cell electrode operating with an acid electrolyte and nitrogen dioxide ($NO_2$) alone or with oxygen. The cathode half cell reaction produces nitric oxide (NO) and water and the $NO_2$ is externally regenerated by reaction of NO with oxygen to produce the nitrogen dioxide for reuse in the cell. When both $NO_2$ and oxygen are used, oxidation of the NO formed back to the $NO_2$ occurs within the cathode itself so it is possible to get more than 100% utilization of the $NO_2$ in the fuel cell.

3 Claims, 1 Drawing Figure

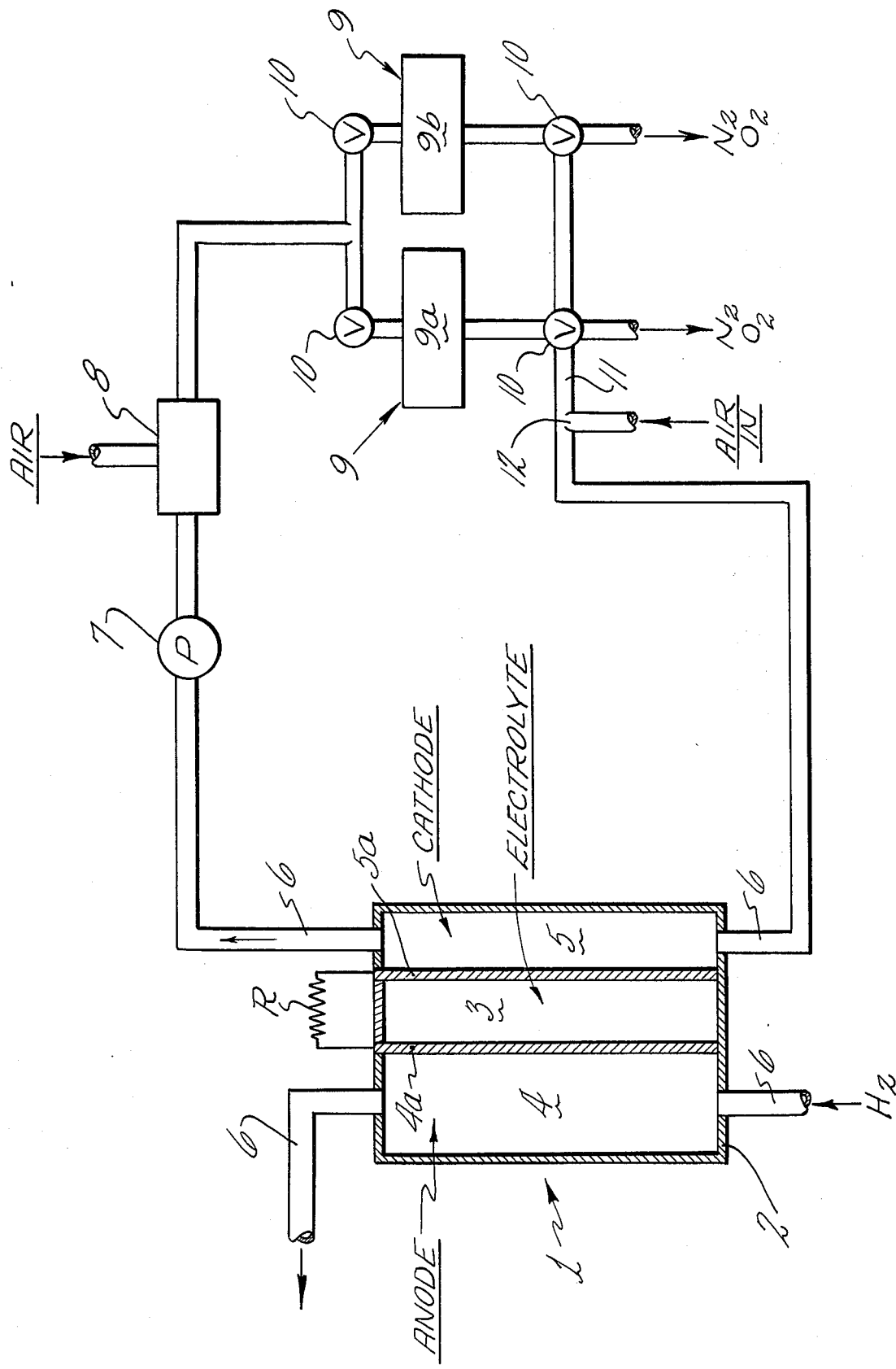

NITROGEN DIOXIDE REGENERATIVE FUEL CELL

BACKGROUND OF THE INVENTION

The conventional gaseous diffusion fuel cell utilizes an anode half reaction employing hydrogen or a mixture of hydrogen, carbon dioxide and carbon monoxide formed from fossil fuel by reforming with steam. The cathodes are usually operated using oxygen from the air. At the temperatures and pressures utilized in the state-of-the-art fuel cells, the rate of reaction of the oxygen at the cathode is low and requires the use of expensive catalysts. Even with the use of catalysts, the performance of these fuel cells may be less than desired. Problems associated with catalyst decay, as well as capital investment required in maintaining large amounts of precious metal catalyst in the fuel cells, would be desirably avoided. It has been proposed to utilize some cathode reactions other than the direct reduction of oxygen. One approach has been the use of nitric acid as the cathode reactant with external regeneration of the nitric acid from the NO and $H_2O$ formed in the cathode reaction. While this approach has promise, the nitric acid is utilized as a liquid and the well-developed technology associated with gaseous diffusion electrodes cannot be utilized. Also, the regeneration of the nitric acid from the nitric oxide and water is a difficult reaction requiring gas-liquid contact which causes a substantial amount of foaming and other processing problems.

According to this invention, we have found that a conventional gaseous diffusion, acid electrolyte fuel cell electrode can be operated using $NO_2$, either alone or in conjunction with oxygen, as the oxidizing agent in a manner which permits the attainment of higher power levels without the use of catalysts at the cathode. In addition, the regeneration of the $NO_2$ from the NO is a gas-gas contact reaction which can be conveniently carried out in an external regenerator.

Accordingly, it is an object of this invention to provide a fuel cell cathode operating with $NO_2$ as the oxidizing agent.

It is another object of this invention to provide a fuel cell cathode operating with nitric oxide and oxygen as an oxidizing agent.

It is another object of this invention to provide a method for operating a gaseous diffusion fuel cell electrode using oxides of nitrogen as the oxidizing agent with recycling of the oxides of nitrogen from external regeneration.

These and other objects of the invention will be readily apparent from the following description with reference to the accompanying drawing wherein the FIGURE is a flow diagram of a fuel cell operating according to our invention.

DESCRIPTION OF THE INVENTION

Referring now to the Figure, fuel cell 1 consists of a housing 2 containing an electrolyte 3 and cathode and anode compartments 4 and 5, respectively. Means 6 are provided for permitting flow of the reactants to and from the electrode assemblies and the electrodes are electrically connected across an external circuit R to permit utilization of the electricity generated in the fuel cell. The specific structure of the electrodes is not an important aspect of this invention; it being recognized that there are many suitable gaseous diffusion electrodes now utilized in the art. Such electrodes comprise porous, chemically resistant bodies 4a and 5a into which both the reactant gases and the electrolyte can diffuse. The electrochemical reaction takes place at the interfaces within the electrode structure where the gas, liquid and reacting surface come in contact. Suitable conducting surfaces are disposed in the electrode structure to facilitate reaction at these surfaces and the electron transfer which occurs causes a flow of electrons through the external circuit. No catalyst is required in the cathode of this invention. The electrolyte used in the state-of-the-art fuel cells of this type is generally concentrated sulfuric or phosphoric acid, and such electrolytes are contemplated for use within this invention. The half-cell reaction occurring at the anode is as follows:

$$H_2 \rightarrow 2H^+ + 2\bar{e} \qquad (1)$$

The electrons generated at the anode are collected by the current collecting means within the electrode and transmitted through the external circuit to the current collecting means of the cathode. The hydrogen ions diffuse into the electrolyte. At the cathode, according to our invention, the following half-cell reaction takes place:

$$NO_2 + 2H^+ + 2\bar{e} \rightarrow NO + H_2O \qquad (2)$$

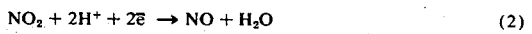

If additional oxygen is present in the gas stream, the following reaction also occurs:

$$2NO + O_2 \rightarrow 2NO_2 \qquad (3)$$

Since reaction (3) occurs spontaneously, it is possible to regenerate a portion of the initial reactant within the fuel cell electrode itself and thereby reutilize the same nitrogen dioxide several times during passage through the cathode. Thus, while it is not necessary that the fuel cell operate with oxygen in addition to the $NO_2$, this is a preferred embodiment and the invention will be described hereinafter with respect to this configuration. The gas stream leaving the cathode chamber through means 6, consists essentially of unreacted $NO_2$ and NO. This gas stream passes through means 6 to pump 7 to oxidizer 8 where air or oxygen is introduced. The NO present reacts with the oxygen in the oxidizing chamber 8 to produce $NO_2$. It should be noted that the reaction occurs relatively rapidly and it is not necessary to have a separate piece of equipment in which the reaction occurs. Oxygen can merely be introduced into the flow line in which sufficient dwell time is designed so that the reaction goes substantially to completion prior to subsequent treatment of the gas stream as hereinafter described.

In order to operate the cell using oxygen from the air it is necessary to remove excess nitrogen from the system in order to maintain a material balance. Various techniques are known to the art for selectively separating nitrogen from nitrogen dioxide. Various selective absorption techniques are known, including molecular sieves, silica gel and absorbants such as ferric sulphate, sulphuric acid and sodium sulfate. All can be used to separate the nitrogen dioxide from nitrogen and oxygen. According to this invention, the gas stream consisting of nitrogen, oxygen and nitrogen dioxide, which leaves oxidizer 8, is passed through separators 9 by means of control valves 10. Two separators are shown so that continuous operation of the fuel cell can be obtained, with one separator being in an absorption mode while the other is in the desorption mode. The bed 9a, in its absorption mode, will absorb the nitrogen dioxide from the entering gas stream and pass the nitrogen and oxygen through valve 10. While bed 9a is in the absorption mode, bed 9b, which has already absorbed its nitrogen dioxide, will be heated or otherwise treated to place it in its desorption mode and the nitrogen dioxide will be passed through valve 10 into line 11 for recirculation to the fuel cell electrode. After a sufficient period of time the operation of beds 9a and b will be reversed by appropriate operation of valves 10 and 9a will be in its desorption mode when 9b is in the absorption mode. Since most absorption processes will separate oxygen with the nitrogen, if it is desired to operate the cathode with additional oxygen for the reasons set forth above, additional air should be introduced into the system at 12. If pure oxygen is introduced into the oxidizer 8 instead of air, no need exists for separators 9 or additional oxygen injection at 12.

EXAMPLE 1

A phosphoric acid gaseous diffusion fuel cell utilizing reformed natural gas as the fuel and $NO_2$ and oxygen as the oxidizing agent with no cathode catalyst, according to this invention was operated using phosphoric acid (95–100%) as the electrolyte at temperatures between 275°F to 320°F and at atmospheric pressure. The fuel cell produced a current density of approximately 200 amps per square foot at 1.0 volts for a power density of 200 watts per square foot. In addition, by using the mixture of $NO_2$ and $O_2$, oxygen utilization of approximately 80% was obtained with a $NO_2$ utilization of approximately 250%.

It should be noted that this invention is directed primarily to the operation of a fuel cell cathode and the results obtained thereby are independent of the particular half-cell reaction going on at the anode. Thus, while it has been disclosed and is preferred that the anode utilize the conventional hydrogen or reformed hydrocarbon gas stream, the use of other anode half-cell reactions is readily within the scope of this invention.

While this invention has been described with respect to specific embodiments thereof, it should not be construed as limited thereto. Various modifications will readily suggest themselves to workers skilled in the art and can be made without departing from the scope of the invention which is limited only by the following claims,

We claim:

1. In a method for operating a fuel cell cathode which comprises passing an oxidant gas stream into contact with an electrolyte on an electrode connected to an external circuit and causing the chemical reduction of the oxidant gas stream to occur with associated transfer of electrons in the external circuit, the improvement which comprises:
   a. using as the oxidant gas stream a mixture comprising gaseous nitrogen dioxide and gaseous oxygen in an amount sufficient to oxidize a substantial portion of the nitric oxide formed by the reduction of nitrogen dioxide back to nitrogen dioxide during passage through the fuel cell cathode;
   b. exhausting said oxidant gas stream from the fuel cell cathode;
   c. introducing air into said exhaust gas stream;
   d. separating the nitrogen dioxide in said gas stream from the remaining components of the gas stream formed according to step (c);
   e. introducing air into the nitrogen dioxide stream obtained according to step (d); and,
   f. introducing the gas stream produced by step (e) into the fuel cell cathode and repeating steps (a) through (f) continuously to provide recirculation and regeneration of said oxidant gas stream.

2. The method of claim 1 wherein said nitrogen dioxide is separated from the remaining components of said gas stream by selective absorption of the nitrogen dioxide.

3. The process of claim 2 wherein the selective absorption of said nitrogen dioxide is accomplished by alternately passing said exhaust gas stream admixed with air through absorbers which vent the nonabsorbed components to the atmosphere and in which at least one of said absorbers is in the absorption mode at the same time as at least one of said absorbers is in the desorption mode, whereby continuous recirculation of the nitrogen dioxide through said system is obtained.

* * * * *